UNITED STATES PATENT OFFICE.

EDGAR H. BENEDICT AND FRANCIS G. BATES, OF PHILADELPHIA, PENNSYLVANIA.

ARTIFICIAL STONE, CEMENT, AND PLASTERING COMPOSITION.

SPECIFICATION forming part of Letters Patent No. 460,105, dated September 29, 1891.

Application filed February 16, 1891. Serial No. 381,621. (No model.)

*To all whom it may concern:*

Be it known that we, EDGAR H. BENEDICT and FRANCIS G. BATES, citizens of the United States, and residents of Philadelphia, Pennsylvania, have invented certain Improvements in Artificial Stone, Cement, and Plastering Compositions, of which the following is a specification.

The object of our invention is to provide a composition to be used for plastering or for the manufacture of bricks, slabs, or blocks for certain purposes, special features of the composition being its light weight, its fire-proof qualities, and the ease with which it can be applied or can be molded into the form of blocks or slabs.

The compound is composed of flour of ashes, lime, plaster-of-paris, and asbestus fiber, with the addition in some cases of alum and marl. The flour of ashes is the finely-powdered portion of the ashes, free from lumps or cinders, this ingredient being employed in place of sand, clay, or cement because it is extremely light, and therefore imparts corresponding quality to the brick or block made from the composition.

The proportions of the various ingredients may be varied without departing from our invention, but we have found in practice that an effective composition for the manufacture of blocks or slabs can be made by the employment of forty-seven parts of flour of ashes, twenty-three parts of lime, twenty-four parts of plaster-of-paris, and four parts of asbestus fiber, two parts of alum being sometimes used as an additional binder.

The compound is mixed with water to the consistency desirable for molding it and "sets" very rapidly, so that the blocks or slabs can be molded immediately before they are to be used, such blocks or slabs being especially available for lining the frame-casings of frame houses or for flues, chimneys, arches between trimmers, partition-walls, &c., the blocks being preferably molded with a slight depression in each face, so that the mortar used in laying the blocks will form keys for the latter.

Instead of being molded into bricks or blocks, the compound may be applied directly for deadening between joists or rafters or in other places where it is desirable to close spaces between the frame-work of the building to prevent drafts, &c.

In preparing the compound to be used as a plaster for ceilings and walls, partitions, &c., the proportions of flour of ashes and lime may be reduced and a quantity of marl added to the compound, a good formula for this class of work being flour of ashes thirty parts, marl twenty parts, lime twelve parts, plaster-of-paris thirty parts, asbestus fiber four parts, and alum five parts, although the alum may in this as in the former case be omitted, if desired.

This compound can be applied in the same manner as ordinary mortar or plaster.

Where fire-proof qualities are not essential the ordinary plastering-hair may be used in place of the asbestus.

Having thus described our invention, we claim and desire to secure by Letters Patent—

1. The within-described artificial stone or plastering compound, consisting of flour of ashes, lime, plaster-of-paris, and asbestus fiber, substantially as specified.

2. The within-described artificial stone or plastering compound, consisting of flour of ashes, lime, plaster-of-paris, asbestus fiber, and alum, substantially as specified.

3. The within-described artificial stone or plastering compound, consisting of flour of ashes, lime, marl, plaster-of-paris, and asbestus fiber, substantially as specified.

In testimony whereof we have signed our names to this specification in the presence of two subscribing witnesses.

EDGAR H. BENEDICT.
FRANCIS G. BATES.

Witnesses:
EUGENE ELTERICH,
HARRY SMITH.